United States Patent [19]

Jawor

[11] Patent Number: 4,649,019
[45] Date of Patent: Mar. 10, 1987

[54] DRAINING DOWN OF A NUCLEAR STEAM GENERATING SYSTEM

[76] Inventor: John C. Jawor, 69 Phillips St., Beacon, N.Y. 12508

[21] Appl. No.: 873,145

[22] Filed: Jun. 6, 1986

Related U.S. Application Data

[63] Continuation of Ser. No. 537,355, Sep. 29, 1983, abandoned.

[51] Int. Cl.⁴ .............................................. F16F 1/34
[52] U.S. Cl. ..................................... 376/316; 165/71; 165/138
[58] Field of Search ....................... 137/587, 588, 589; 165/71, 138, 186; 376/308, 310, 316, 368, 463

[56] References Cited

U.S. PATENT DOCUMENTS

| | | | |
|---|---|---|---|
| 1,992,319 | 2/1935 | Maggenti | 137/589 |
| 3,783,895 | 1/1974 | Weichselbaum | 137/588 |
| 3,825,060 | 7/1974 | Heller et al. | 165/71 |
| 4,109,829 | 8/1978 | Kuckens et al. | 137/588 |

Primary Examiner—Deborah L. Kyle
Assistant Examiner—Richard L. Klein
Attorney, Agent, or Firm—Brooks Haidt Haffner & Delahunty

[57] ABSTRACT

A method and means for continuously introducing nitrogen into the primary coolant side of each steam generator during drain-down of a nuclear powered steam generating system is described, which will prevent the forming of a vacuum at the tops of the inverted U-tubes of the generators, thus to allow continuous drain-down of the water from within the tubes.

14 Claims, 2 Drawing Figures

DRAINING DOWN OF A NUCLEAR STEAM GENERATING SYSTEM

This application is a continuation of application Ser. No. 537,355, filed Sept. 29, 1983, now abandoned.

FIELD OF THE INVENTION

This invention relates to nuclear power steam generating systems and, more particularly, to techniques for draining down, or lowering the level of the reactor primary coolant water within the system.

BACKGROUND AND OBJECTS OF THE INVENTION

At appropriate times, as when refueling of the nuclear reactor is to be done or repairs are to be made within any of the water circulating loops, the level of the primary coolant water within the system must be lowered usually to a level below that of the horizontally disposed inlet and outlet pipes extending to and from the reactor. In the usual reactor system which serves several vertical U-tube type steam generators, the draining down is usually effected through both the chemical volume control system and the residual heat removal system, from which the draining water is led into holdup tanks. As is well known, such draining down is conducted only after the system has been cooled and depressurized by releasing steam from the steam generators, shutting down the main circulating coolant water pumps, depressurizing the pressurizer, and starting the residual heat removal pumps to actuate the residual heat removal system. The draining down procedure is initially monitored using the pressurizer water level indicator until all of the water has been drained from the pressurizer, after which it is monitored using the low-level water monitoring system and by measuring the amount of water received in the holdup tanks, until completion of the drain down.

As is also well known, during the drain down a gas which is inert to the system, such as nitrogen is introduced into the system through the top of the system pressurizer tank, to displace the water which is draining from the system. When the water is drained from the pressurizer, whose discharge flows into one of the "hot legs", or reactor outlet conduits, which leads to the bottom of one of the steam generators, the nitrogen introduced through the pressurizer will begin to disperse throughout system from the bottom of the pressurizer. The nitrogen first enters the reactor above the water level therein via the reactor outlet conduit to which the pressurizer is connected, and then passes via all of the reactor inlet and outlet conduits, which are horizontally disposed at the same elevation, to the respective steam generators and main circulating pumps in the respective steam generation loops. However, the inverted U-tube bundles in the respective steam generators, which extend upwardly from the elevation, drain slowly and sporadically due to vacuum formation at the tops of the inverted U-tubes, and such unpredictable flow is a familiar phenomenon to those skilled in the art.

This sporadic or intermittent flow-down of the water from within the inverted U-tubes is due to the interruption of the flow of the nitrogen into the U-tubes from the reactor inlet and outlet conduits which is caused by surges of water from the U-tubes themselves. That is, in much the same way as the water in a suddenly inverted bottle will be sporadically discharged from its downwardly facing neck only as fast as air bubbling in the opposite direction relieves the vacuum which constantly forms at the upper, closed end of the bottle, the water which is sporadically surging in considerable quantities from the tube bundles spills back into the reactor inlet and outlet conduits, closing off the flow of nitrogen therethrough, whereupon additional water cannot drain from the tube bundles because of the vacuums forming at their inverted, upper ends. Moreover, these surges create back pressures in the system which force quantities of the nitrogen to become entrapped, for example within the seal packages of the circulating pumps, so that nitrogen circulation is interrupted. In this regard, it will be understood that after nitrogen emerges from the underside of the pressurizer its pressure has been reduced virtually to atmospheric pressure and that the nitrogen is then in an expanded condition, so that it is unlikely to continue to flow into the steam generator U-tubes against the weight of the water draining from the tubes.

Thus, the familiar "gurgling" of the drain-down water occurs, causing intermittent significant upward readings in the system level indicators, and significant time intervals, sometimes of several hours duration, before the draining down, which is self-controlled by the system, continues. Thus, for example, in a typical Westinghouse nuclear powered system having four steam generators, the time required to drain down the primary coolant water from the system to the level at which the steam generators have been emptied averages about 32 hours. Where the draining down is only for the purpose of checking the tubes in the steam generators or for making repairs within the primary coolant system itself, this time duration poses a significant limitation upon the early completion of such inspection or repairs.

Accordingly, it is intended by the present invention to provide a method and means for significantly reducing the time required for draining down the primary coolant water in such a system. Moreover, it is intended by the present invention to make the drain-down process a continuous one, with no delays being incurred due to sporadic draining of the water from the generator U-tubes.

Because the taking of direct visual readings on the reactor cooling system low-level monitors is believed necessary during the drain-down procedure, it is a further object of the present invention to significantly reduce the number of such direct readings as are required during the drain-down operation, to thereby significantly reduce the exposure of the operator to radiation, as occurs whenever such direct readings are taken. That is, using conventional drain-down techniques, standard procedure requires the drain-down operator to enter the vapor containment area every hour to read the reactor coolant system level, each trip resulting in approximately 10 milirems of exposure to radiation. By the present invention it is intended to increase the reliability and confidence of the operator in the indirect level monitoring system, and thereby reduce the frequency of such direct readings taken within the containment. For example, using the present invention, such direct readings need be taken only once per eight hour shift, as compared to hourly, as aforesaid.

It is also known that such accurate and careful monitoring of the level of the draining reactor coolant water is necessary for maintaining a positive suction head on the residual heat removal pumps to prevent cavitation in the pumps and consequent pump damage. Accordingly, it is intended by the present invention to promote an accurate and continuous drain-down, so as to assure that such positive suction head is always maintained on the residual heat removal pumps, as a matter of course.

SUMMARY OF THE INVENTION

Briefly and generally describing the present invention, it provides a method and means for continuously bubbling a gas which is inert to the system, such as nitrogen, into the tube bundles of the steam generators during their drain-down, so as to prevent the formation of vacuum within the closed inverted U-sections at the tops of the inverted U-tubes, and thus permit continuous draining from the generator tubes at the same rate of draining as that of the remaining water in the system. The level of the water within the tube bundles will therefore always be approximately the same as the level of the water elsewhere within the system during the drain-down. Thus, the previously described "gurgling" is prevented, and a constant pressure head is maintained at all times on the residual heat removal pumps.

In its preferred embodiment, the nitrogen is introduced via an existing opening at an appropriate location within the system, such as either a vent opening or drain opening along one of the conventional flow transmitter impulse reference tubes which leads to the intermediate leg of the primary coolant path for each steam generator. Because the location of its attachment to the conduit is more nearly directly below the steam generator tube bundle into which it is to bubble, the nitrogen is preferably introduced on the high impulse side of the flow transmitter, and preferably into either its vent tube or drain tube opening. Thus, the nitrogen gas need not "roll up" the curved radius of the intermediate leg elbow to which the low impulse side of the flow transmitter is conventionally attached.

Alternatively, the nitrogen gas might be introduced through an attachment aperture in the manway plate which is bolted to the channel head below the generator tube bundle. Of course, the providing of such special aperture will require substantial engineering and stress testing expense, as will be understood.

Such continuous introduction of nitrogen gas to the inverted U-tubes of the steam generators will assure continuous drain-down at the maximum rate at which the water may leave the system, or at any controlled lower rate of draining, yet the advantages of the invention will be obtained. Thus, the time duration of the drain-down can be reduced by at least eight hours and, more likely, sixteen hours in the nuclear power steam generating system to be described, as compared with some 32 hours previously required.

DETAILED DESCRIPTION OF PREFERRED EMBODIMENTS

Figure 1:
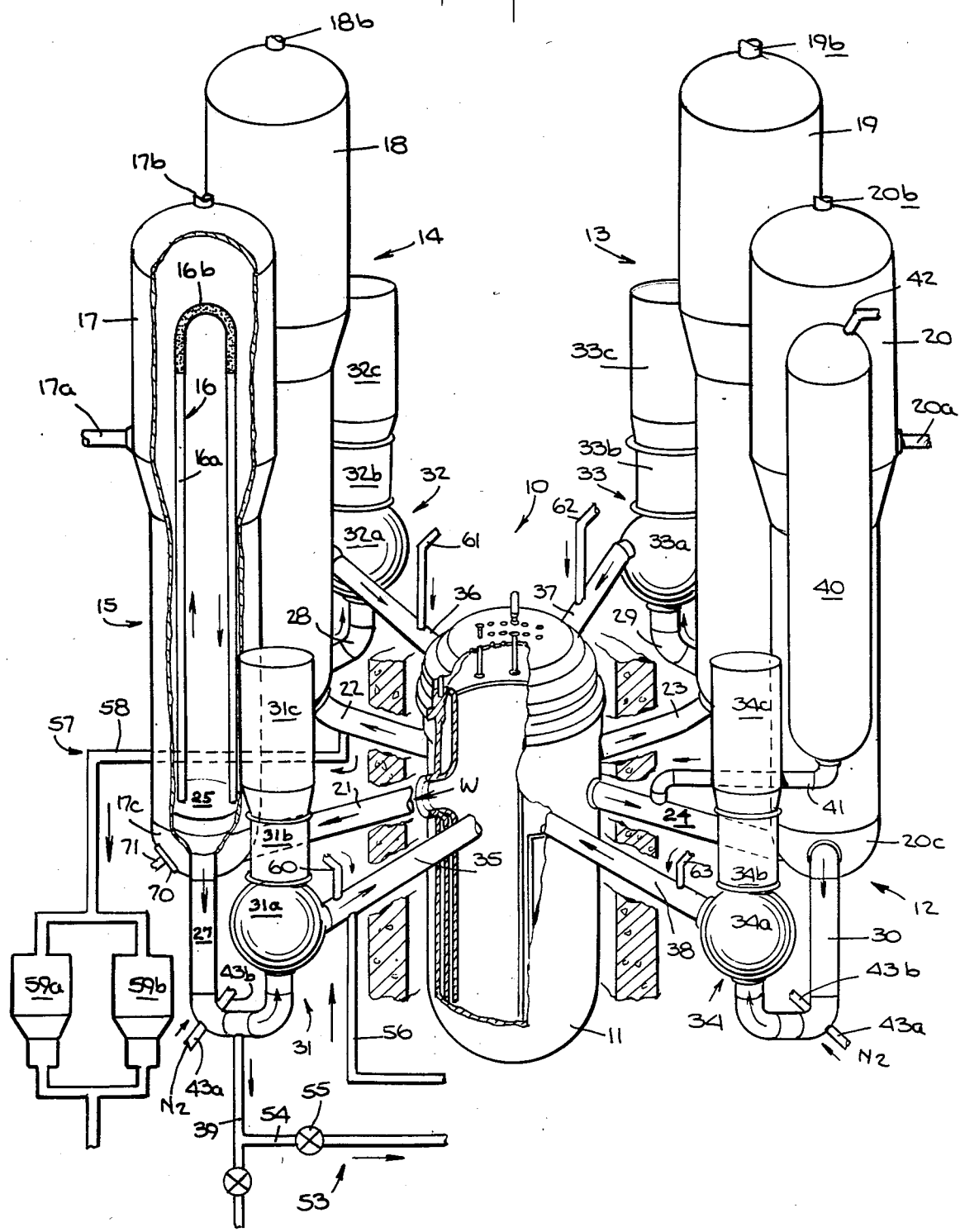
Figure 2:
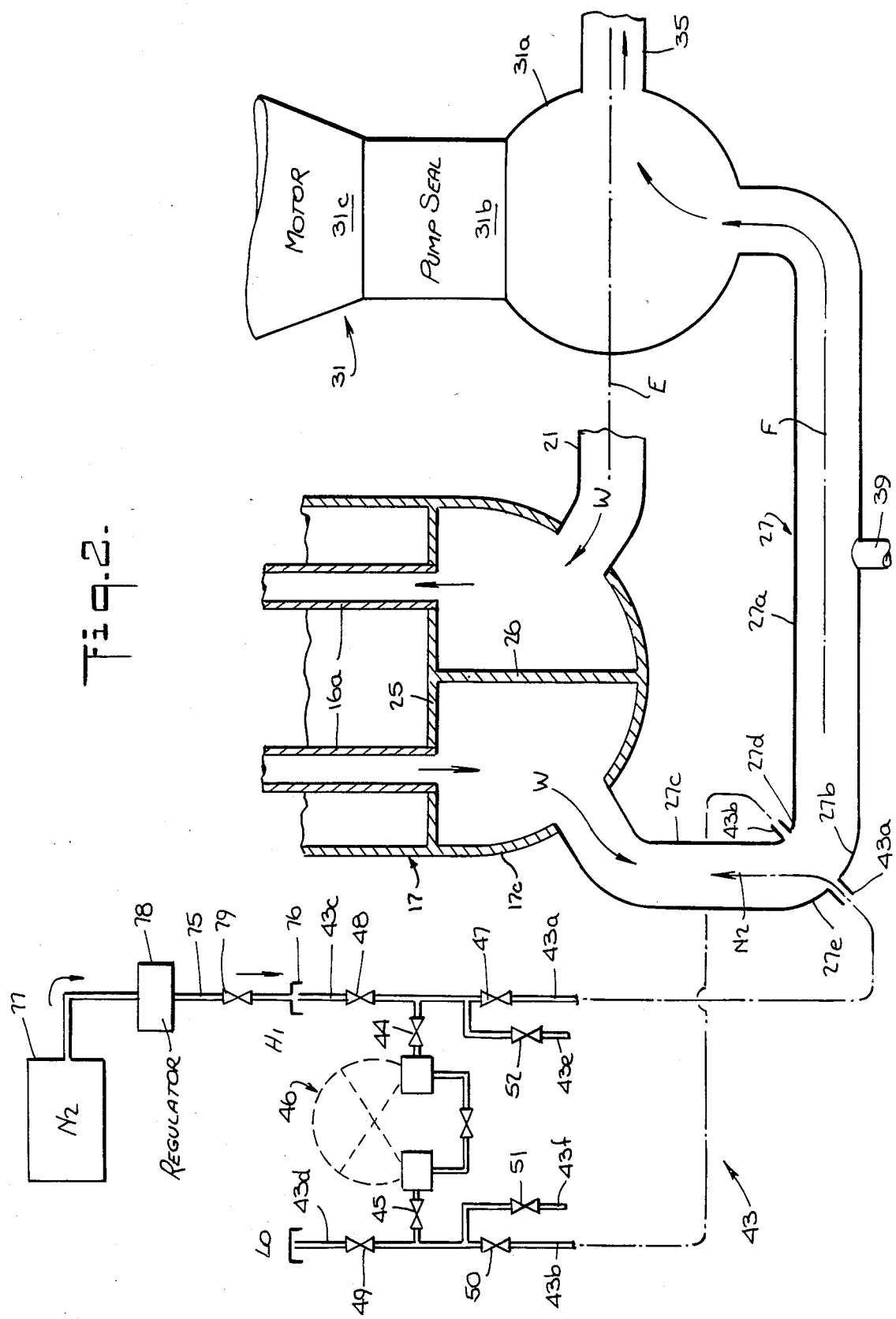

These and other objects, features and advantages of the invention will become more readily apparent from the following detailed description thereof, when read with reference to the accompanying drawings, in which:

FIG. 1 is a perspective and diagrammatic illustration of a typical nuclear powered steam generating system in which the present invention is incorporated; and FIG. 2 is a diagrammatic and fragmentary illustration, to an enlarged scale, of only certain portions of the steam generating system of FIG. 1.

Referring to FIG. 1, a typical nuclear powered steam generating system is generally indicated by reference numeral 10, and includes a reactor vessel 11 serving each of four steam generating loops respectively and generally indicated by reference numerals 12-15, inclusive. As is well known, and with reference to a typical steam generating loop 15, reactor cooling water W, which has been heated to approximately 550° F. within the reactor 11, is circulated in the direction of the arrows through the inverted U-tube bundle 16 of the steam generator 17. In FIG. 1, only one U-tube 16a is illustrated for clarity, although it will be understood that the tube bundle 16 actually includes many such U-tubes arranged in nested relation. The respective steam generators 18, 19 and 20 in the other steam generation loops 14, 13 and 12, contain similar inverted U-tube bundles, as is well understood. Each steam generator has a feed water inlet 17a (in the case of steam generator 17) and a steam outlet 17b at its top, as is also well known. Insofar as they can be seen in FIG. 1, similar steam generator steam outlets 18b, 19b and 20b, and another secondary water inlet 20a, are indicated.

The respective steam generators 17-20 receive primary coolant water from the reactor 11 via reactor coolant water outlet conduits 21-24, which conduits also serve as the primary water inlet conduits of each of the respective steam generators. As will be understood from the fragmentary showing of steam generator 17 in FIG. 1 and from FIG. 2, the superheated primary water W enters the steam generator 17 via the channel head 17c at its lower end and passes upwardly through all of the tubes 16a in the tube bundle 16, entering and leaving via the downwardly facing open ends of the tubes which are respectively attached and pass through a tube sheet 25. A vertical divider wall 26 within the channel head 17c directs the flow of water into one end of each tube and out from the other, as will be understood.

The steam generator inlet conduits are sometimes referred to as the "hot legs" of the steam generation loops 12-15.

After the primary water W heats the steam generator feed water which surrounds the tube bundle 16, thus generating steam, the now cooler primary water W leaves the steam generator 17 via the steam generator outlet conduit 27, which is also connected to the channel head 17c. The water is conducted to the pump bowl or impeller casing 31a of the centrifugal type main circulation pump 31, by which it is pumped back into the nuclear reactor 11. Thus, the steam generator outlet conduit 27 may also be referred to as the inlet conduit to the pump 31. The steam generator outlet and pump inlet conduits of the other steam generation loops 14, 13 and 12 are respectively indicated by reference numerals 28, 29 and 30 in FIG. 1. Similarly, the other main circulation pumps are indicated by reference numerals 32, 33 and 34, and their impeller casings respectively indicated by numerals 32a, 33a and 34a. The conduits 27, 28, 29 and 30 are sometimes referred to as the "intermediate legs" of the steam generation loops, and the respective pump outlet conduits, which also serve as the reactor inlet conduits 35-38, are sometimes referred to as the "cold legs" of the loops. The diameters of the respective conduits 21-24, 27-30, and 35-38, are relatively large, being on the order of from about 27" to about 32".

For purposes of describing the present invention, it will also be understood that the nuclear powered steam generation system 10 includes a pressurizer 40 for maintaining the pressure of the primary coolant water within the system at about 2235 psig, the lower end of the pressurizer tank being connected to the hot leg 24 of one of the steam generation loops 12, as seen in FIG. 1, by the pressurizer line 41. As is well understood, the pressurizer 40 is maintained about half-full of water, the remaining volume of the pressurizer tank being normally filled with saturated water vapor. For the normal drain-down procedure, the pressurizer tank 40 has a nitrogen orifice 42 at its top.

From FIG. 2 it will be understood that the common elevation E of all of the hot legs 21-24 of the steam generation loops 15-12 is the same as that of all of the respective cold legs 35-38. The intermediate legs 27-30 include respective horizontally disposed portions 27a-30a at a common elevation F, which is usually some 4' below the elevation E. The horizontally disposed portions, such as the horizontally disposed portion 27a in FIG. 2, extend from 90-degree elbow portions, such as the elbow portion 27b, which redirect the downwardly flowing water within the downwardly directed leg portions, such as the leg portion 27c, from the generators. As will become pertinent as the description proceeds, it will be understood that the elbow portion 27b has a smaller-radius portion 27d and a larger-radius portion 27e, as indicated in FIG. 2. The intermediate leg 27 also has a downwardly directed drain line 39 attached thereto.

As also diagrammatically illustrated in FIG. 2, the system includes a flow transmitter, generally indicated by reference numeral 43, by which the flow of coolant water W through the intermediate leg 27 is detected and measured. The intermediate legs 28-30 of the other steam generator loops have respective similar flow transmitters (not shown). As is well known, the flow transmitter 43 includes a high-impulse reference tube 43a which connects to the larger-radius portion 27e of the conduit 27, and a low-impulse reference tube 43b which connects to the conduit 27 at the smaller-radius portion 27d of the elbow portion 27b of the line, and a differential pressure is determined which indicates the flow in the line. Although otherwise irrelevant to the present description, it will also be understood that the flow transmitter 43 includes a high-side vent portion 43c; a low side vent portion 43d; a high side drain line 43e; and a low side drain line 43f. Respective valves 44, 45 may be used to isolate the test block, generally indicated by reference numeral 46, from the high and low impulse lines 43c, 43d, respectively. Other valves, respectively indicated by numerals 47-52, are used to open and close the lines in the flow transmitter at appropriate times, as will be understood.

Referring again to FIG. 1, the nuclear powered steam generation system 10 also includes a chemical-volume control system, which is only partly and fragmentally indicated by reference numeral 53, by which chemical additives are introduced for various purposes. It is through this system that the draining down of the entire reactor primary coolant water is conventionally conducted. Only the level control line 54, including the level control valve 55, and the return line 56 of the chemical volume control system 53 are diagrammatically illustrated in FIG. 1. However, it will be understood that water drawn from the system via the drain line 39 and level control line 54 ordinarily passes through heat exchangers, flow orifices, and a volume control tank, none of which are shown, before it is returned via a charging pump (also not shown) to the system via the line 56 which connects to the cold leg 35 of the loop 15. The chemical volume control system 53 serves the entire reactor coolant system 10, as is well known.

As is also well known, such a steam generation system 10 further includes a residual heat removal system which is only partly and fragmentally indicated by reference numeral 57 in FIG. 1. The residual heat removal system is operated only when the main circulation pumps 31-34 are shut down, and when the reactant coolant water W is being drained down from within the system. The residual heat removal system draws water W from a hot leg, such as the hot leg 22, of one of the steam generation loops 18 via a line 58. The water is pumped by twin residual heat removal pumps 59a, 59b through heat exchangers (not shown), after which the cooled water is returned to the system via the cold legs 35-38 of all four loops 15-12, the returning water entering these legs via the respective return lines 60-63. It should be noted that a portion of the water W being removed during a drain down initially leaves the system via the residual heat removal system 57, as is conventional. For example, if the draining down is conducted at about 80 gallons per minute, some 50 gallons per minute is initially drawn via the chemical volume control system 53, and the remaining 30 gallons per minute is initially drawn via the residual heat removal system 57, the latter being diverted into the system 53 which conveys all of the water to holdup tanks (not shown).

When the reactor coolant water W is to be drained down to or below the elevation E (FIG. 2), steam is discharged via the steam outlets 17b-20b from all of the steam generators 17-20, and the respective loop circulating pumps 31-34 are stopped. The residual heat removal pumps 59a, 59b are started, and respective valves (not shown) within the residual heat removal system 57 are opened or closed, as the case may be, to divert the water, taken from the hot leg 22, into the chemical volume control system 53 rather than to the return lines 60-63. Similarly, respective valves (not shown) are either opened or closed, as the case may be, within the chemical volume control system to divert the water being taken from the system 10 via the line 54, as well as the water received from the system 57 as aforesaid, to three holdup tanks (not shown), rather than to the volume control tank as would return the water to the system via the line 56. Thus, all of the water draining from the system will be stored in the holdup tanks (not shown) until it is to be returned to the system 10.

During this conventional drain down the system is depressurized, and the water draining from within the pressurizer 40 is replaced by nitrogen gas entering via the gas line 42 (FIG. 1). The level of the draining water is constantly monitored during the drain down procedure, at first by the water level indicator (not shown) on the pressurizer 40 until the water has been almost emptied therefrom, and thereafter using the low-level monitoring system (not shown), as is conventional.

Referring again to FIG. 1, it will be seen that, during the draining of the water W from the system 10, vacuum pockets 16b form at the upper closed ends of the inverted U-tubes 16a, which inhibit the downward draining of the water from the tubes. Thus, as the water is being drained from the system 10, substantial quantities may "hang up" within the several tube bundles 16 of the steam generators 17-20 until such vacuum pockets are broken. In this regard, it should be noted that the U-tubes 16a extend some 35' above the tube sheet 25 and are usually $\frac{3}{4}''$ in diameter. Normally, the vacuum is ultimately broken by the introduction of the nitrogen gas flowing from the pressurizer 40 via the pressurizer line 41. As the system water level recedes to the level of the tops of the conduits 21-24 and 35-38, the nitrogen from the pressurizer enters and spreads throughout the system via these conduits and is normally expected to enter the channel heads at the bottom ends of the steam generators, as well as the pump impeller casings. However, as the nitrogen begins to enter the channel heads and to bubble upwardly into the tube bundles 16, the water contained in the tube bundles initially surges downwardly and cuts off the flow of nitrogen, so that the vacuum regions 16b are re-established within the tubes 16a. Moreover, this surging tends to force the nitrogen towards other locations within the system, such as up into the respective seal packages 31b-34b which are situated below the pump motors 31c-34c of the main circulating pumps 31-34, and this diversion also tends to interrupt the flow of nitrogen to the tube bundles 16. As is well known, such surging occurs intermittently and sporadically during the drain down procedure, causing momentary increases in the general level of the water W within the system. It therefore becomes difficult to know with any degree of accuracy exactly how much water remains within the system at any given time. That is, at any given time considerable quantities of water may remain within the tube bundles 16, being unable to flow downwardly due to the presence of the vacuum area 16b, and such quantities may remain for long periods of time, e.g., for several hours, before the vacuum is suddenly released by an additional flow of the nitrogen gas to the tube bundle. Even when the drain-down is considered complete, it may not be possible to positively determine that such is the case. In fact, when a manway cover, such as the cover 70 (FIG. 1), on any of the steam generator channel heads is removed, water remaining in the tube bundle due to such vacuum may suddenly rush out through the manway opening, possibly causing injury to the operator.

However, using the present invention the formation of such vacuum within the areas 16b at the tops of the tubes 16a is prevented, so that the water will drain continuously from the tubes during the drain-down procedure, thus preventing the aforementioned surges and uncertainties regarding the actual quantity of water remaining in the system at any given time.

As previously stated, the invention provides a method and means for continuously introducing nitrogen, or other gas which is inert to the system, into the primary water side of each steam generator to flow upwardly within the tubes 16a, thereby to relieve the vacuum which tends to form at the tops of the tubes, thus permitting continuous drain-down of the reactor coolant system. As seen in FIGS. 1 and 2, the nitrogen is bubbled into the intermediate legs of each steam generator loop at respective locations such that it will rise against the flow of water W, into the channel heads beneath the generators, and thence into the discharge ends of the tubes 16a. The nitrogen is continuously introduced, thereby continuously relieving the vacuum area 16b, and is preferably commenced at the beginning of the drain down. However, the nitrogen introduction should in any event be commenced when the water level has receded to the lowest part of the pressurizer 40 during the drain down procedure.

With reference to FIG. 1, it will be understood that the nitrogen might be introduced at any location beneath the tube sheet 25, such as via an opening 71 through the manway cover plate 70 on the channel head 17c. However, to avoid the necessity of providing such additional openings 71, the preferred embodiment of the invention provides for the introduction of the nitrogen through any appropriate openings of the existing system, as will be described.

Referring to FIG. 2, a preferred embodiment of the invention provides for the introduction of the nitrogen $N_2$ into one of the vent portions 43c of the flow transmitter 43. In order that the nitrogen may bubble directly upward in the direction of the dotted line arrow head $N_2$ towards the downwardly facing open ends of the tubes 16a, the preferred location of introduction is via the high-impulse reference tube 43a which enters the intermediate leg 27 within the larger-radius portion 27e of the elbow 27b. Accordingly, the nitrogen line tubing 75 is connected to the open, upper end of the high-impulse vent tube 43c. The connection is via a conventional type compression fitting 76, which need not be further described.

The nitrogen is contained under pressure within a conventional nitrogen tank source 77 (FIG. 2), several tanks usually being required to supply more than the total of some 687 cubic feet of volume of the tube bundle 16 in each steam generator, at atmospheric pressure. The compressed nitrogen passes within the tubing 75 through a regulator 78 in which it is reduced in pressure to about 20 psi, and thence through a shut-off valve 79 and the compression fitting 76, into the tubing 43c. At this time the valves 47 and 48 are open, and the valve 44 leading to the transmitter block and the drain valve 52 are closed. Similarly, the valves 49, 50, and 51 on the low-impulse side of the flow transmitter are also closed, to prevent escape of the nitrogen through the low-impulse tubing 43b, as will be understood.

Alternatively, the nitrogen tank 77 and its tubing 75 might be similarly attached to the high-side drain opening 43e of the flow transmitter, in which case the drain valve 52 would be opened and the vent valve 48 would be closed.

Of course, as other alternative embodiments of the invention, the nitrogen line 75 might be attached to the low-side drain opening 43f, or to the low-side vent tube 43d, in similar manner, in which cases the high-side would be closed off, by closing the valve 47.

The flow rate of the introduced nitrogen from the tanks 77 is not critical, such being only sufficient to keep the water flowing out from the tube bundles 16. Considering that a full bottle or tank 77 of nitrogen is initially contained at 2400 psi, the flow rate at the regulated pressure of 20 psi will be on the order of about 16 cfm. Considering that the maximum draining rate of a system through the orifices of the chemical volume control system may be as high as about 120 gpm or 125 gpm and that some 87,000 gallons, more or less, may be drained from the system 10, the drain-down might be completed within a period of time as short as 12 hours. However, since the drain-down rate is probably more nearly 80 gallons per minute in the usual case, it will be seen that drain-down should be completed easily within about 16 hours, as compared to usual drain-down times on the order of 32 hours.

In a typical operation and with reference first to FIG. 2, at the commencement of a drain-down of the nuclear powered steam generation system 10, the compression fitting 76 on the nitrogen line 75 is attached to the open end of the vent tube 43c of the flow transmitter 43, and the same connections are made between similar nitrogen tank lines and the similar flow transmitter vent tubes within the other steam generation loops 14, 13 and 12. The flow transmitter valves 48 and 49, as well as the drain valves 51, 52 in the flow transmitter 43 are normally closed. After the steam escape valves of the respective steam generators 17–20 have been opened and the system has been depressurized from about 2235 psi to about 400 psi, the residual heat removal system 57 is started to remove residual heat, and the main circulation pumps 31–34 are then stopped. By operation of the residual heat removal system 57, the temperature of the reactor cooling water W is reduced from about 500° F. to about 200° F.

Drain-down of the water W within the system 10 is then commenced by opening and closing the appropriate valves (not shown) within both the residual heat removal system 57 and the chemical volume control system 53 to divert the water flowing therein to the holdup tanks in which it will be stored until it is to be returned to the system. Monitoring of the water level within the system 10 is continued, initially at the presurizer, and thereafter using the low-level monitoring system (not shown) as the drain-down proceeds.

Referring to FIG. 2, the flow transmitter valves 44, 45 and 50 are then closed, and the valves 48 and 79 are then opened to permit nitrogen gas to flow from the line 75 into the flow transmitter high-impulse reference tube 43a and thence into the steam generator water outlet conduit portion 27c, as aforesaid. Similar connections are made to permit nitrogen to similarly enter the remaining steam generators 18–20 as the drain-down proceeds. The nitrogen gas $N_2$ bubbles up through the channel head 17c and into all of the tubes 16a of the tube bundle 16, the nitrogen rising through the contained water W to release the vacuum from the regions 16b (FIG. 1) at the tops of the tubes. It will be seen that the water level within the tubes 16a recedes at the same rate as the water recedes throughout the system 10 and, because of the continuous introduction of the nitrogen at these locations beneath the tubes, the draining of the water from the tubes is continuous, and not sporadic.

Thus has been described a method and means for introducing nitrogen during the draining down of a nuclear powered steam generation system, which achieves all of the objects of the invention.

What is claimed is:

1. The method of draining down contained reactor-coolant water from the inverted vertical U-tubes of a vertical-type steam generator in which the upper, inverted U-shaped ends of said tubes are closed and the lower ends thereof are open, said steam generator being part of a nuclear powered steam generating system wherein said reactor coolant water is normally circulated from and back into the reactor via a loop comprising said steam generator and inlet and outlet conduits connected to the lower end of said steam generator, said method comprising the steps of continuously introducing a gas which is inert to the system and which is under pressure above atmospheric pressure into at least one of the downwardly facing open ends of each of said U-tubes from below the tube sheet in which the open ends of said U-tubes are mounted adjacent the lower end of said steam generator, while permitting said water to flow out from said open ends of the U-tubes.

2. The method according to claim 1, wherin said gas is nitrogen.

3. The method of draining down contained reactor-coolant water from the inverted vertical U-tubes in the bundle thereof within each of a plurality of vertical-type steam generators within a nuclear powered steam generating system wherein said reactor-coolant water is normally circulated from and back into the reactor via a corresponding plurality of loops each comprising one of said steam generators and a circulating pump, said water circulating through each said steam generator via an inlet conduit and an outlet conduit respectively attached to the opposite sides of a divided channel head on the lower end of the steam generator, comprising the steps of continuously introducing a gas which is inert to the system and which is at a pressure above atmospheric pressure into the bottom ends of said U-tubes of each said steam generator from at least one side of said divided channel head whereby the gas rises to the closed tops of said inverted U-shaped tubes passing through said water therein, while permitting said water to drain downwardly out from said U-tubes.

4. The method according to claim 3, wherein said channel head has flow openings and wherein said gas is introduced via one of the flow openings for said water through the channel head adjacent to the lower end of said steam generator.

5. The method according to claim 1, wherein said gas is introduced through an opening in a manway attached to said channel head adjacent to the lower end of said steam generator.

6. The method according to claim 5, wherein said gas is introduced via said outlet conduit attached to said one side of said channel head.

7. The method according to claim 5, wherein said nuclear powered steam generating system includes respective flow transmitters for detecting flow of said coolant water through said outlet conduit of each said steam generator, each said flow transmitter having a high-impulse reference tube and a low-impulse reference tube both of which are attached to said outlet conduit of the steam generator, and wherein said gas is introduced via one of said flow transmitter impulse reference tubes associated with each said steam generator.

8. The method according to claim 7, wherein said gas is introduced via said high-impulse reference tube.

9. The method according to claim 7, wherein each said flow transmitter impulse reference tube includes a vent portion, and said gas is introduced via said vent portions.

10. The method according to claim 9, wherein said gas is nitrogen introduced under regulated pressure to each said vent portion from a pressurized tank of said nitrogen gas.

11. The method according to claim 3, wherein said system further includes a pressurizer normally communicating with said coolant-water as it flows into the reactor, and nitrogen under pressure is introduced into said system via said pressurizer during draining down of said coolant water from said reactor, and said continuously introducing said gas into said U-tubes is conducted concurrently with said introduction of nitrogen via said pressurizer.

12. The method according to claim 11, wherein said gas introduced into said U-tubes is nitrogen under pressure.

13. In a nuclear powered steam generating system comprising a vertical-type steam generator having a channel head at its lower end including a vertical dividing wall defining a primary water inlet side and a primary water outlet side of the generator, a primary water inlet conduit connected to said inlet side of the generator, a primary water outlet conduit connected to said outlet side of the generator and extending downwardly therefrom, a tube bundle comprising inverted U-tubes having respective closed upper ends and open lower ends for receiving and circulating said primary water from said inlet side to said outlet side of said generator, and a flow transmitter for detecting flow through said outlet conduit and having a high-impulse reference tube and a low-impulse reference tube respectively attached to said outlet conduit, the improvement comprising a source of pressurized gas which is inert to said system, means for regulating the pressure of said gas, and means connecting said pressurized gas source through said pressure regulating means to one of said flow transmitter impulse reference tubes for introducing said gas at a pressure above atmospheric pressure, continuously into said downwardly extending outlet conduit to flow upwardly into said tube bundle through said open lower ends of said U-tubes.

14. The improvement according to claim 13, wherein said one of said flow transmitter impulse reference tubes includes a vent portion having an open end, and said connecting means from said gas source is connected to said vent portion open end.

* * * * *

UNITED STATES PATENT AND TRADEMARK OFFICE
CERTIFICATE OF CORRECTION

PATENT NO. : 4,649,019

DATED : March 10, 1987

INVENTOR(S) : John C. Jawor

It is certified that error appears in the above-identified patent and that said Letters Patent is hereby corrected as shown below:

Column 10, line 23, "claim 1" should be --claim 3--.

Column 10, line 27, "claim 5" should be --claim 3--.

Column 10, line 30, "claim 5" should be --claim 3--.

Signed and Sealed this

Twenty-seventh Day of September, 1988

*Attest:*

DONALD J. QUIGG

*Attesting Officer*  *Commissioner of Patents and Trademarks*